United States Patent [19]

Slaughter, Jr.

[11] 4,222,408
[45] Sep. 16, 1980

[54] CHECK VALVE

[75] Inventor: Lomis Slaughter, Jr., Houston, Tex.

[73] Assignee: Anderson, Greenwood & Co., Houston, Tex.

[21] Appl. No.: 926,908

[22] Filed: Jul. 21, 1978

[51] Int. Cl.³ .............................................. F16K 15/03
[52] U.S. Cl. ...................................... 137/518; 137/499
[58] Field of Search ........................ 137/499, 518, 521

[56] References Cited

U.S. PATENT DOCUMENTS

| 947,166 | 1/1910 | Smith | 137/521 |
|---|---|---|---|
| 1,712,418 | 5/1929 | Boynton | 137/499 X |
| 2,293,956 | 8/1942 | Walthers | 137/518 |
| 3,053,275 | 9/1962 | Waterfill | 137/521 X |
| 3,967,642 | 7/1976 | Logsdon | 137/499 |

*Primary Examiner*—Robert G. Nilson
*Attorney, Agent, or Firm*—Vinson & Elkins

[57] ABSTRACT

A check valve having a body with a passage therethrough, a pair of vanes pivotally mounted within said passage so that they open and close flow therethrough responsive to flow in one direction, said vanes having an arcuate shape to create a smooth venturi passage between each vane and the opposed wall of the body so that the vanes open responsive to excess flows in the direction opposite to said one direction.

1 Claim, 2 Drawing Figures

CHECK VALVE

BACKGROUND

Check valves of the prior art have included plates which were pivotally mounted within flow passage and spring loaded toward closed position. Examples of this type of structure are shown in the J.S. Wheeler, Jr. U.S. Pat. Nos. 3,007,488; 3,026,901; 3,072,141; and 3,074,427. These valves are closed by spring action. Thus, they prevent all flow in one direction and greatly restrict low flows in the opposite direction but open fully with increased flows.

SUMMARY

The present invention relates to an improved check valve. This check valve has a pair of arcuate shaped vanes which form a venturi flow area through the valve and the vanes are pivotally mounted and spring loaded toward their open flow position.

An object of the present invention is to provide an improved check valve having very low pressure drops at flow rates, below a design flow rate.

A further object of the present invention is to provide an improved check valve having a region above the design flow rate of substantially constant flow.

Another object is to provide an improved check valve having a sharp and quick closing when flow is reversed.

BRIEF DESCRIPTION OF THE DRAWINGS

These and other objects and advantages are hereinafter set forth and explained with respect to the drawings wherein.

DESCRIPTION OF THE PREFERRED EMBODIMENT

Figure 1:
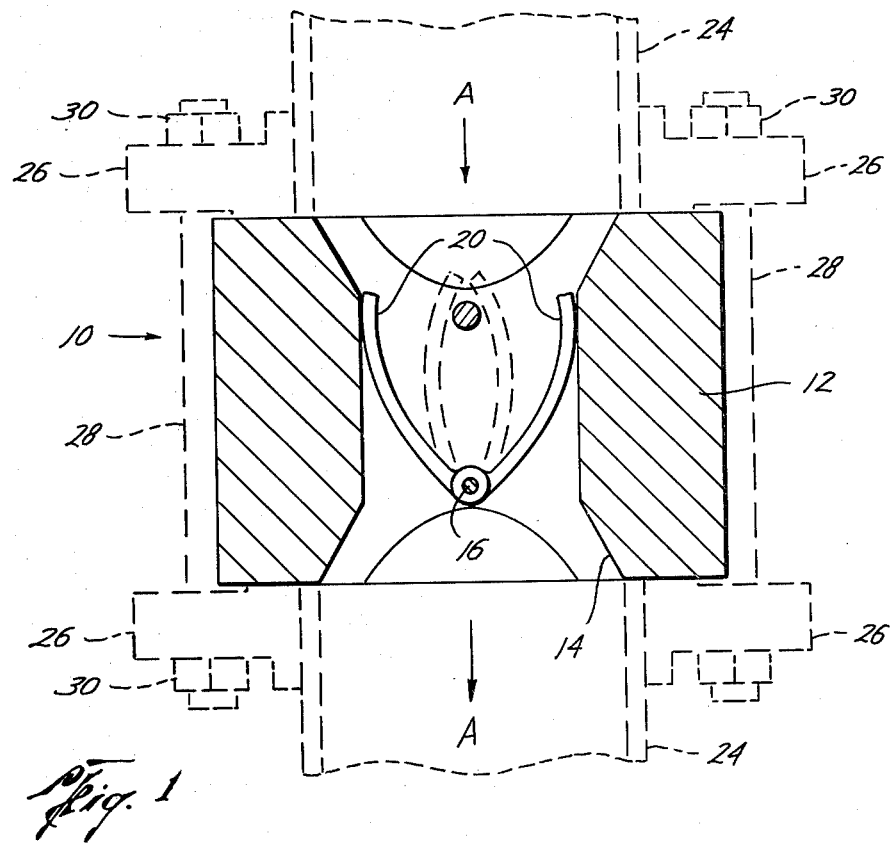
FIG. 1 is a sectional view of a form of the improved check valve of the present invention.
Figure 2:
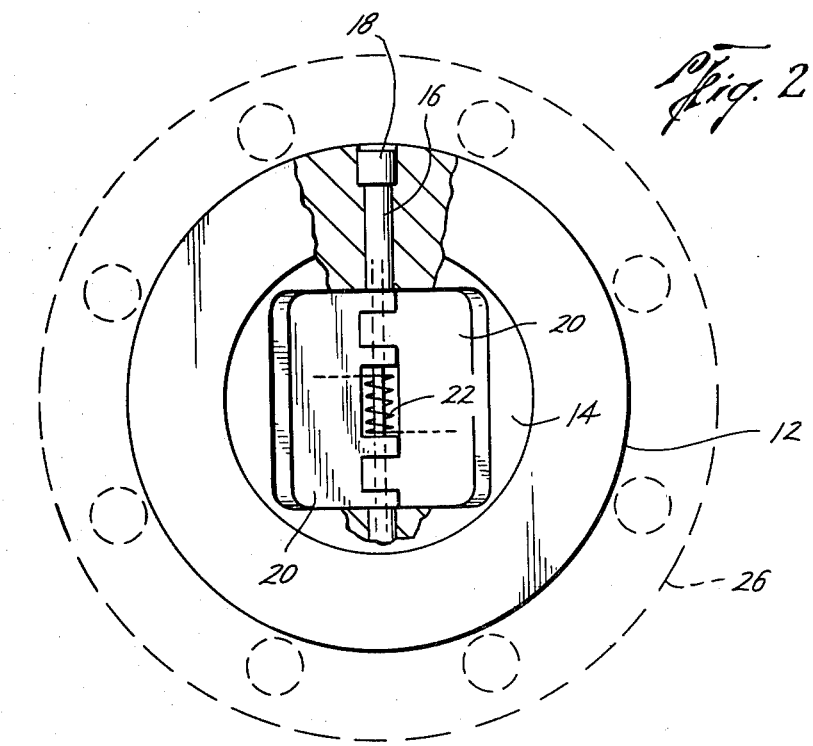
FIG. 2 is a plan view of the check valve in FIG. 1 with portions thereof broken away to show the mounting of the vanes.

The check valve 10 illustrated in FIGS. 1 and 2 is a single hinged check valve and includes the body 12 having a flow passage 14 extending therethrough which is round in section at both ends and square in section through the intermediate portion. The pin 16 extends through body 12 and across passage 14 and is secured therein by plug 18. The vanes 20 are pivotally mounted on pin 16 and are urged inwardly by the spring 22 toward the open flow position shown by dashed lines in FIG. 1. As can be seen, the vanes 20 coact with the passage 14 through body 12 to form venturi flow sections.

The vanes 20 may be circular, eliptical or any other suitable air foil shape so that a lift force is created on vanes 20 responsive to the flow of fluids through passage 14 past vanes 20.

The check valve 10 may be mounted in a flowline 24 between flanges 26 by the bolts 28 and nuts 30 as is shown in dashed lines in FIG. 1. With check valve 10 clamped in such position, the flow of gases in the direction A at low flow rates is unaffected until a predetermined flow rate is reached, such that the lift forces exceed the spring forces, and then the vanes 64 open and the flow forces them outward to check or stop the flow.

Tests have shown that when flow is in a direction opposite to direction A flow is allowed with very little pressure loss at low flow velocities. As higher pressure differentials are imposed across check valve 10, a modulating effect takes over and flow is substantially constant independent of pressure through a considerable range. Such constant flow characteristic can be used to control flow which is opposite to direction A.

When the vanes 20 are positioned within passage 18, the flow passage 14 is divided into two venturi sections. In these venturi sections, the gases flowing in either direction are accelerated and a lift force is created on the vanes 20.

As flow through the check valve 10 commences there is little resistance to flow. The vanes 20 do not move until there are sufficient lift forces developed by the flow to overcome the biasing of the units toward their streamlined open position. Thereafter, continued increase in flow results in a commensurate increase in lift forces on vanes 20 which move outward responsive thereto.

Where flow is in the direction A for valve 10, flow in the low velocity region before the vanes begin to move have much less pressure drop than the prior check valves since the vanes minimize flow disruption due to their streamlining and the springs attempt to maintain the vanes at their position of minimum flow disruption. Prior valves did not have the streamlining and their springs urged them into positions of maximum flow disruption. Once the spring force is overcome, however, the vanes snap to the closed position. Also, prior check valves were not capable of modulating the flow as is accomplished by the modified or single pivoted form of the present invention.

It should be noted that even though not shown the present invention could be utilized by mounting the vanes on opposite sides of the flow passage provided they are sufficiently long so that they don't reverse themselves.

What is claimed is:
1. A check valve comprising
a body having a passage extending therethrough,
a pair of opposed vanes,
means for pivotally mounting said vanes within said body passage including a pin extending through said passage on which said vanes are mounted,
said vanes being sufficiently large and of proper configuration to substantially close said body passage to prevent flow therethrough,
means resiliently urging said vanes in a direction away from their closed flow position,
each of said vanes having an arcuate shape in section with respect to the flow axis of said body passage to create a venturi restriction in said passage whereby flow in either direction creates a lift on said vanes tending to move them toward closed flow position,
said vanes are adapted to close flow when flow in one direction reaches a pre-selected maximum, and
said vanes developing sufficient lift forces from flows in the opposite direction whereby they modulate the flow to be substantially constant independent of pressure through a considerable range.

* * * * *